US009152993B2

(12) United States Patent
Efraimov et al.

(10) Patent No.: US 9,152,993 B2
(45) Date of Patent: Oct. 6, 2015

(54) SYSTEMS AND METHODS FOR A WEBSITE APPLICATION FOR THE PURPOSE OF TRADING, BARTERING, SWAPPING, OR EXCHANGING PERSONAL PROPERTY THROUGH A SOCIAL NETWORKING ENVIRONMENT

(75) Inventors: Benyomin Efraimov, Rego Park, NY (US); David G. Raven, Lawrence, NY (US)

(73) Assignee: Sean Werner, Brooklyn, NY (US)

( * ) Notice: Subject to any disclaimer, the term of this patent is extended or adjusted under 35 U.S.C. 154(b) by 0 days.

(21) Appl. No.: 13/476,704

(22) Filed: May 21, 2012

(65) Prior Publication Data

US 2012/0304305 A1    Nov. 29, 2012

Related U.S. Application Data

(60) Provisional application No. 61/519,744, filed on May 27, 2011.

(51) Int. Cl.
| | | |
|---|---|---|
| *G06F 7/04* | (2006.01) | |
| *G06F 17/00* | (2006.01) | |
| *G06Q 30/08* | (2012.01) | |
| *G06F 21/33* | (2013.01) | |
| *G06F 21/64* | (2013.01) | |
| *G06Q 10/10* | (2012.01) | |

(52) U.S. Cl.
CPC ............... *G06Q 30/08* (2013.01); *G06F 21/33* (2013.01); *G06F 21/645* (2013.01); *G06Q 10/10* (2013.01)

(58) Field of Classification Search
CPC ............................. H04N 21/2187; H04L 63/10

USPC ................ 705/26, 37, 64; 709/224; 726/27, 1
See application file for complete search history.

(56) References Cited

U.S. PATENT DOCUMENTS

| | | | | |
|---|---|---|---|---|
| 6,865,559 | B2 * | 3/2005 | Dutta .............................. 705/75 |
| 7,831,500 | B2 * | 11/2010 | Wenger et al. ................... 705/37 |
| 8,819,536 | B1 * | 8/2014 | Lucovsky et al. .............. 715/205 |
| 2002/0049847 | A1 * | 4/2002 | McArdle et al. .............. 709/227 |
| 2004/0049446 | A1 * | 3/2004 | Seljeseth ......................... 705/37 |
| 2004/0083143 | A1 * | 4/2004 | Rodger ............................ 705/27 |
| 2004/0102991 | A1 * | 5/2004 | Casey et al. ...................... 705/1 |
| 2007/0005482 | A1 * | 1/2007 | Graham .......................... 705/37 |
| 2007/0214259 | A1 * | 9/2007 | Ahmed et al. ................. 709/224 |
| 2007/0244768 | A1 * | 10/2007 | Nguyen et al. .................. 705/26 |
| 2007/0244769 | A1 * | 10/2007 | Boesel ............................ 705/26 |
| 2007/0255807 | A1 * | 11/2007 | Hayashi et al. ............... 709/219 |
| 2008/0052218 | A1 * | 2/2008 | Taylor et al. ..................... 705/37 |
| 2008/0113674 | A1 * | 5/2008 | Baig ........................... 455/456.3 |
| 2008/0215456 | A1 * | 9/2008 | West et al. ........................ 705/27 |
| 2008/0313456 | A1 * | 12/2008 | Menadue et al. ............. 713/156 |
| 2009/0055436 | A1 * | 2/2009 | Ayeni .......................... 707/104.1 |

(Continued)

*Primary Examiner* — Abu Sholeman
(74) *Attorney, Agent, or Firm* — Leason Ellis LLP

(57) ABSTRACT

A system is provided for facilitating a personal property trading system and social networking environment that allows users to interact and create dialogue and socialize in relation to possible trades of personal property or services. This application will allow users who are willing to trade an item, service or favor to obtain similar wants or needs. This form of haggling and the feeling of success are proven to be mentally stimulating, proving another benefit for users. Users will be able to comment and haggle, as well as suggest other users that they believe may have a match on their 'TRADING ITEMS' and 'STUFF I WANT' lists. The system will promote environmentally conscious trading by bringing unwanted items back to use.

1 Claim, 5 Drawing Sheets

(56) References Cited

U.S. PATENT DOCUMENTS

| | | | |
|---|---|---|---|
| 2009/0138817 A1* | 5/2009 | Oron et al. | 715/788 |
| 2009/0192911 A1* | 7/2009 | Graf | 705/26 |
| 2009/0249244 A1* | 10/2009 | Robinson et al. | 715/781 |
| 2010/0228740 A1* | 9/2010 | Cannistraro et al. | 707/748 |
| 2010/0241575 A1* | 9/2010 | Cotton et al. | 705/80 |
| 2011/0035292 A1* | 2/2011 | Boesel | 705/26.3 |
| 2011/0246657 A1* | 10/2011 | Glow | 709/231 |
| 2012/0185275 A1* | 7/2012 | Loghmani | 705/3 |
| 2012/0198497 A1* | 8/2012 | Chan | 725/40 |
| 2012/0265758 A1* | 10/2012 | Han et al. | 707/737 |
| 2013/0054423 A1* | 2/2013 | Hwang | 705/27.1 |
| 2013/0073473 A1* | 3/2013 | Heath | 705/319 |
| 2013/0268427 A1* | 10/2013 | Kligman et al. | 705/37 |
| 2014/0161412 A1* | 6/2014 | Chase et al. | 386/224 |
| 2014/0201084 A1* | 7/2014 | Dagenais et al. | 705/64 |
| 2014/0279214 A1* | 9/2014 | Wagoner-Edwards et al. | 705/26.8 |

* cited by examiner

Report / Block User

[user avatar]

User Name

TRADING ITEMS

1. Athletic Equip.. 2
2. Clothing 5
3. Music 2
4. Services 6
5. Sports Equipment 3
6. Video Games 8

201 ⟶ Trading Friends

Stuff I Want

Fig. 2

Users Info: Anywhere, NY, Traded: 34, Top Wants: Video game, Guitar, Skateboard, Ride to school  Rating: Great - 5.5 Stars

TRADING ITEMS

ATHLETIC EQUIPMENT

[Chin-up Bar] [Workout Bench] ← 202

Chin-up Bar    Workout Bench

CLOTHING

[Ski Jacket] [Jeans] [T-Shirt] [Sports Jacket] ← 202

Ski Jacket    Jeans    T-Shirt    Sports Jacket

More......

MUSIC

[Guitar] [Keyboard] ← 202

Guitar    Keyboard

SERVICES

| Hosting a Party – Trade for Food and BYOB | House Hold Repairs | Skiing Lessons | Guitar Lessons | ← 202 |

PARTY!!!    Need Help?    Former Instructor    All Levels

More......

MORE ITEMS...

SYSTEMS AND METHODS FOR A WEBSITE APPLICATION FOR THE PURPOSE OF TRADING, BARTERING, SWAPPING, OR EXCHANGING PERSONAL PROPERTY THROUGH A SOCIAL NETWORKING ENVIRONMENT

CROSS REFERENCE TO RELATED APPLICATION

This application claims priority under 35 U.S.C. §119(e) to U.S. Provisional Application Ser. No. 61/519,744, filed on May 27, 2011, which is hereby incorporated by reference herein in its entirety.

TECHNICAL FIELD OF THE INVENTION

This patent application relates generally to the field of online transaction systems in particular facilitating the exchange of personal property through a social networking environment.

BACKGROUND OF THE INVENTION

Over the years the internet (or the World Wide Web as it is also commonly known) has become a leading source of gaining information, communicating, socialization, and e-commerce. In today's electronic age the convenience of shopping and socializing through the internet has revolutionized the way we communicate, especially today with the popularity of smart phones and their ability to transfer large amounts of data through mobile phone networks. A typical internet user will purchase gifts, personal items, services and more as an alternate to traditional shopping methods. These users will, more than likely, be solicited by companies and internet users that are using e-commerce as a means of sales for a profit. The demand to gain information through the internet is continuously gaining more and more popularity, whether to gain common knowledge, seek out users with similar interests, socialize, purchase items, or in this case trade, barter, swap or exchange personal property and services.

Over the years many websites have used the internet for the sale, or the mediating of a sale of goods and services and more recently the sharing of information. Since the beginning of the electronic or internet age there has been more or less a website for almost anything that one could think of including bartering and trading websites.

Certain websites have created a method for multiple users to meet in a public server environment and exchange specific personal property or services. Today these websites are open to the public after standard registration requirements. Typical user options for these websites are within a vast database of items or a search engine to narrow down specific wanted items or services from a general network of users, often resulting in sharing information with unknown users.

Other websites solely act as a brokering mediator for the buying, selling or exchanging of items offered by registered users. On such websites users are free to browse all items with multiple search options and transactions are conducted with limitless geographic locations. Typically these websites will charge a fee for this brokering service and shipping costs would be the responsibility of either the sender or the recipient.

While some Social Networking sites are currently using methods to allow its registered users to facilitate its network to offer items for sale, or trade between its registered users, they are not limiting certain options in the hopes of generating a higher number of users. The present invention is designed to make trading and exchanging of personal items, services or favors more friendly and sociable while creating an environmentally conscious, "Green" scenario.

The popularity of social networking websites has been proven to be at the forefront of the internet and certain organizations around the world have had many positive effects from it, some being; assisting authorities on tracking down criminals, friends reuniting, networking, and more. The present invention is looking to change the way users socialize and communicate by offering actual tangible goods and services in exchange for other goods and services. Specific user options will eliminate the present day "Hard or Cold Sell" and give them the convenience to, most importantly, anonymously report users as well as choose not to trade or block that specific user. The concept is for users to know that whomever they choose to trade, barter, swap or exchange personal property or services with there would be an existing relationship. There would also be a level of trust and confidence by other users recommended by or to them.

SUMMARY OF THE INVENTION

Technologies are presented herein in support of a system for facilitating the exchange of personal property through a social media environment. According to a first aspect, a personal property trading system is provided having one or more processors configured to interact with a computer-readable storage medium and execute one or more software modules stored on the storage medium, including a personal property trading application, executing on a device having a display and an interface. The system comprising: a user page module executing in the processor and configuring the processor to provide a user page for displaying personal property that is available for trading on the display; a comments module executing in the processor and configuring the processor to provide a comments section for displaying negotiations and social interactions between users of the system on the display, respond to comments received through the interface and cause the comments section to update. The system further comprising a blocking module executing in the processor and configuring the processor to prevent non compliant use of the system.

These and other aspects, features, and advantages can be appreciated from the accompanying description of certain embodiments of the invention and the accompanying drawing figures and claims.

BRIEF DESCRIPTION OF THE DRAWINGS

FIG. 2 depicts an exemplary screenshot of a Trading Items webpage in accordance with at least one embodiment disclosed herein;

DETAILED DESCRIPTION OF CERTAIN EMBODIMENTS OF THE INVENTION

Figure 1A:
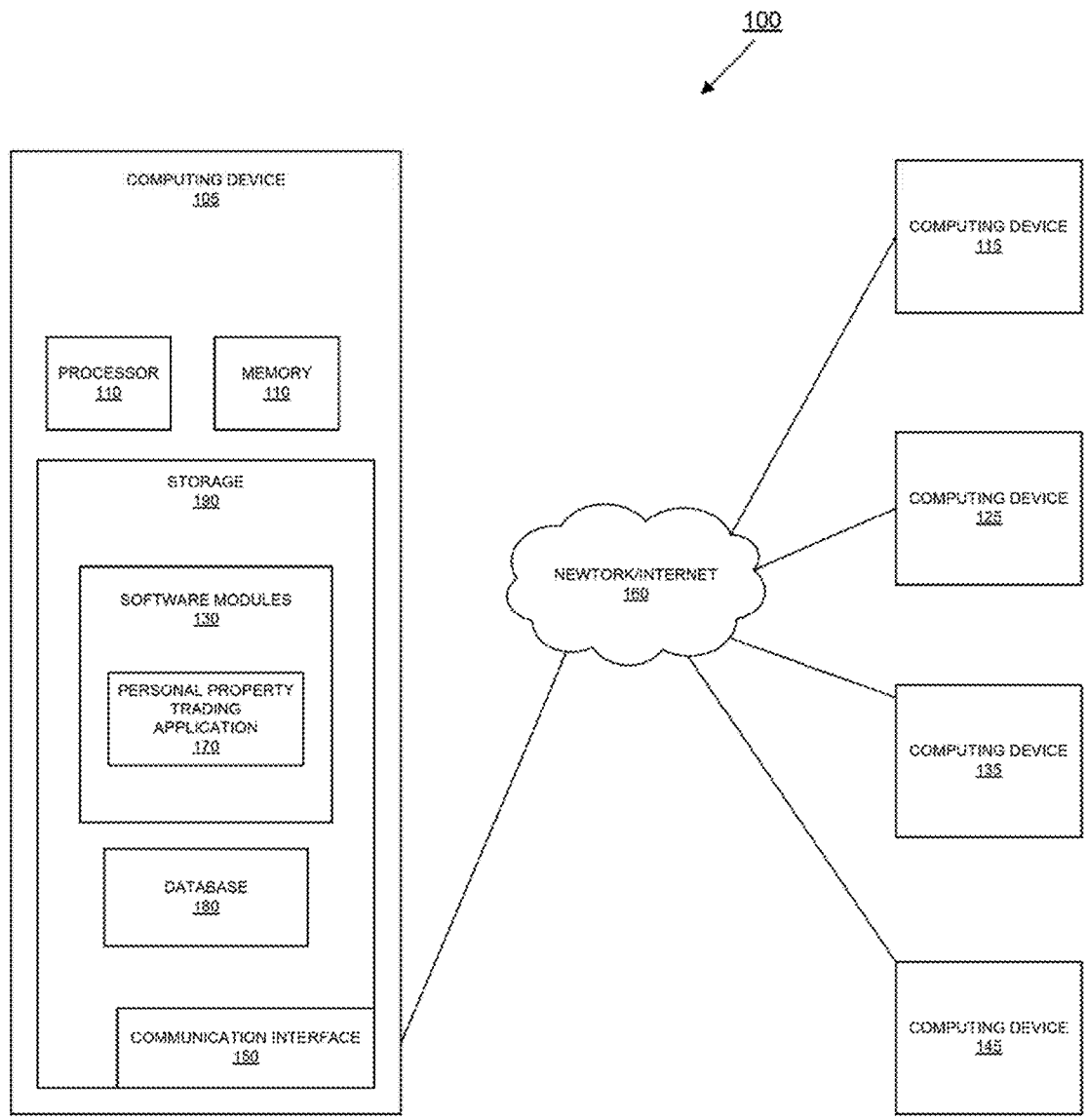
FIG. 1A is a high-level diagram illustrating an exemplary configuration of a payment processing system.

By way of overview and introduction, various systems and methods are described herein that facilitate and enable the exchange of personal property via a social networking environment. This invention is for the purpose of exchanging personal property between users of a social networking website. The specific idea is that of a friendly, trading website while creating a benefit for the environment by bringing unwanted items back to use.

This invention uses unique systems and methods that facilitate the bartering of personal property through a social network website and allow users to regulate the personal property they are freely willing to trade, barter, swap or exchange (using all descriptive terms). The primary user would maintain control of which other users within their network would have access to their webpage/s.

The website and each independent user's webpage's are designed to show personal property that the user is freely willing to barter, trade, swap, or exchange. Comments will be permitted and negotiations and haggling is another friendly way to socialize. On agreeing and accepting the Terms and Conditions of the Website, users will not be permitted to directly sell or solicit personal property or services for a profit. Although at the discretion of each user there could be a monetary exchange for a difference in value that must be agreed when an item is wanted. The website and each independent page would strictly be for the purpose of trading and bartering and users will have the ability to report and block other users that are attempting to directly sell or solicit items. It is the inventors intention to serve two purposes with this invention; 1) to create another way of socializing and sharing through the negotiations and haggling of personal property and services; 2) to create an environment that will recycle and reuse items that are unwanted by one user and wanted and/or needed by another user, therefore creating a environmentally conscious "Green" method to bring specific items back into use.

An exemplary computer system is shown as a block diagram in FIG. 1 which is a high-level diagram illustrating an exemplary configuration of a personal property trading system 100. In one arrangement, computing device 105 can be a personal computer or server though it should be understood that computing device 105 of payment processing system 100 can be practically any computing device and/or data processing apparatus capable of embodying the systems and/or methods described herein.

Computing device 105 of personal property trading system 100 includes various hardware and software components that are operatively connected and serve to enable operation of the personal property trading system 100. The computing device 105 includes a processor operatively connected to a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type. Computing device 105 can also include an input interface and a display.

Memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer for example, through the Internet 160 using an Internet Service Provider.

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within payment processing system 100. For instance, program code stored in a computer readable storage device in a server can be downloaded over a network from the server to payment processing system 100.

Preferably, included among the software modules 130 is a personal property trading application 170 that is executed by processor 110. During execution of the software modules 130, and specifically the personal property trading application 170, the processor 110 configures the circuit board 140 to perform various operations relating to the exchange of personal property with computing device 105, as will be described in greater detail below. It should be understood that while software modules 130 and/or personal property trading application 170 can be embodied in any number of computer executable formats, in certain implementations software modules 130 and/or personal property trading application 170 comprise one or more applications that are configured to be executed at computing device 105 in conjunction with one or more applications or 'apps' executing at remote devices, such as computing device(s) 115, 125, 135, and/or 145 and/or one or more viewers such as internet browsers and/or proprietary applications. Furthermore, in certain implementations, software modules 130 and/or personal property trading application 170 can be configured to execute at the request or selection of a user of one of computing devices 115, 125, 135, and/or 145 (or any other such user having the ability to execute a program in relation to computing device 105, such as a network administrator), while in other implementations computing device 115 can be configured to automatically execute software modules 130 and/or personal property trading application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of payment processing system 100. It should be noted that although database 180 is depicted as being configured locally to computing device 105, in certain implementations database 180 and/or various of the data elements stored therein can be located remotely (such as on a remote device or server—not shown) and connected to computing device 105 through network 160, in a manner known to those of ordinary skill in the art.

As referenced above, it should be noted that in certain implementations, such as the one depicted in FIG. 1A, various other computing devices 115, 125, 135 and/or 145 can be in periodic or ongoing communication with computing device 105 thorough a computer network such as the Internet 160. Though not shown, it should be understood that in certain other implementations, computing devices 115, 125, 135, and/or 145 can be in periodic or ongoing direct communication with computing device 105, such as through communications interface 150. It should also be understood that computing devices 115, 125, 135 and/or 145 of payment processing system 100 can be practically any computing device and/or data processing apparatus capable of embodying the systems and/or methods described herein such as a personal computer, smart phone, tablet computer. Computing devices 115, 125, 135 and 145 can also include an input interface such as a keyboard, touchscreen or other input device and a visual display.

Communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the 802.11 standard) though it should be understood that communication interface 150 can be practically any interface that enables communication to/from the computing device 105.

At various points during the operation of personal property trading system 100, computing device 105 can communicate with one or more computing devices, such as those controlled and/or maintained by one or more users 115, 125, 135, and/or 145, each of which will be described in greater detail herein. Such computing devices transmit and/or receive data to/from computing device 105, thereby preferably initiating maintaining, and/or enhancing the operation of the personal property trading system 100, as will be described in greater detail below. It should be understood that the computing devices 115 can be in direct communication with computing device 105, indirect communication with computing device 105, and/or can be communicatively coordinated with computing device 105, as will be described in greater detail below. While such computing devices can be practically any device capable of communication with computing device 105, in the preferred embodiment certain computing devices (e.g., that of vendor 115) are preferably servers, while other computing devices (e.g., that of purchaser 125) are preferably user devices (e.g., personal computers, handheld/portable computers, smartphones, etc.), though it should be understood that practically any computing device that is capable of transmitting and/or receiving data to/from computing device 105 could be similarly substituted.

It should be noted that while FIG. 1 depicts a personal property trading system 100 with respect to computing devices 115, 125, 135, and 145, it should be understood that any number of computing devices can interact with the personal property trading system 100 in the manner described herein. It should be further understood that a substantial number of the operations described herein are initiated by and/or performed in relation to such computing devices. For example, as referenced above, such computing devices can execute applications and/or viewers which request and/or receive data from computing device 105, substantially in the manner described in detail herein.

In the description that follows, certain embodiments and/or arrangements are described with reference to acts and symbolic representations of operations that are performed by one or more devices, such as the personal property trading system 100 of FIG. 1A. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the payment processing system 100. Other components shown in FIG. 1A can be varied from the illustrative examples shown. The different embodiments can be implemented using any hardware device or system capable of running program code. In another illustrative example, payment processing system 100 can take the form of a hardware unit that has circuits that are manufactured or configured for a particular use. This type of hardware can perform operations without needing program code to be loaded into a memory from a computer readable storage device to be configured to perform the operations.

Embodiments and/or arrangements can be described in a general context of computer-executable instructions, such as program modules or applications, being executed by a computer. Generally, program modules or applications include routines, programs, objects, components, data structures, etc., that perform particular tasks or implement particular abstract data types.

It should be further understood that while the various computing devices and machines referenced herein, including but not limited to computing device 105, computing devices 115, 125, 135, and 145 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the personal property trading system 100 and the various elements and components described above will be further appreciated with reference to the features and functions of the system as described below.

When an individual becomes a user of the personal property trading system 100, the user can be prompted to register for the system and input personal information and preferences through a 'Registration Page'. The registration page is generated by processor 110 executing personal property trading application 170 and a registration page module, and is displayed to the user through a remote device 115. Through this registration page a user, using remote device 115, can view, interact and input information into the system through the various fields and functions accessible through registration page. Users can create their personal, independent, pages by inputting information through the 'Registration Page'. The information that would be inputted includes personal information such as a photo, age, hometown, etc. The user can also list items for trade and include information such as sizes, specifications, dimensions, and condition of items for trade. On initial registration this option may be skipped and updated regularly. User can also create a list of wanted items also referred to as, 'Stuff I Want', as shown in with the top ten visible on the users 'Main Page' out of which the top trading or wanted items or services would be shown as photos on the same page.

Some further options available to the user through the registration page include selecting users to trade with from their list of 'Trading Friends'. This page is regularly updated and requires acceptance from other users. During registration users will have the option to select which features of their 'Main Page' would be available for view by other users and their associated networks. The user can also provide preferred shipping information. This information is optional and all users must agree to the Terms and Conditions and release this information at their own risk. Preferences and Account Settings are also inputted on registration and could be updated at any time. These preferences include privacy settings, log-in information, passwords, personal interests, and other comments. Aside from log-in information and passwords all other options are optional.

Figure 1B:
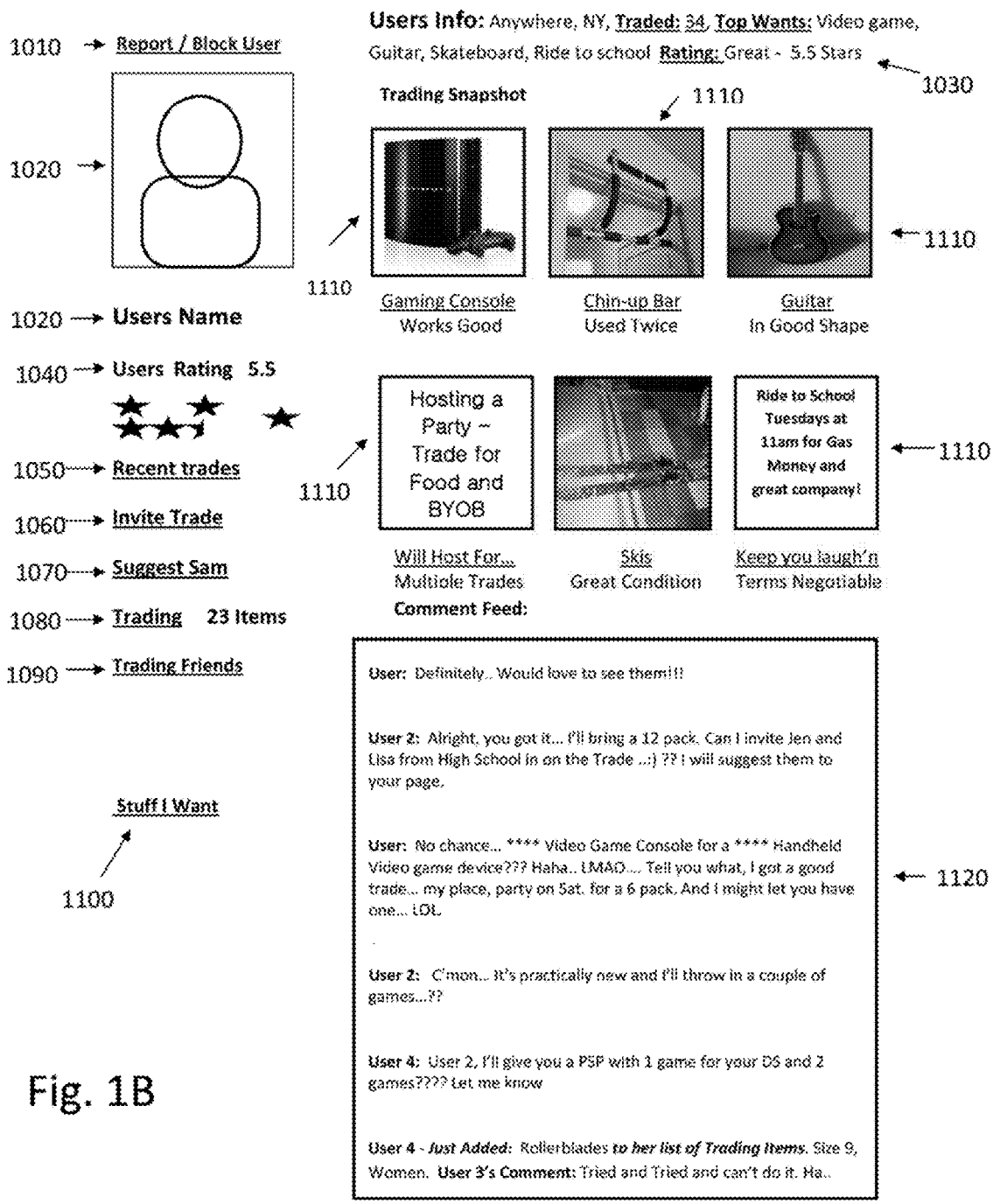
FIG. 1B depicts an exemplary screenshot of a Main Page webpage in accordance with at least one embodiment disclosed herein.

FIG. 1B depicts a screenshot of an exemplary user's 'Main Page'. The main page is generated by processor 110 executing personal property trading application 170 and a main page module, and is displayed to the user through a remote device 115. Through this main page a user, using remote device 115, can view, interact and input information into the personal property trading system 100 through the various fields and functions accessible through the main page as further described herein. The main page is unique to each individual user and shows the functions of the individual user's website home or 'Main Page'. Certain functions will be regularly updated. As shown in FIG. 1B, the users 'Main Page' would be viewed by anyone that the primary user chooses such as any specific network of users that has been created.

Some features and functions of the main page can include: Provide a Report/Block option will allow users to report other users that are using the website for personal gain or illegal activity 1010; provide the users profile picture and name 1020; provide the user's hometown and other personal information, as well as a brief description of trading information 1030; provide a User Rating based on a rating system that is determined by a brief survey mandatorily taken after each trade by the secondary trading participant 1040; provide a 'Recent Trade' link that directs the user to a webpage disclosing information on that specific users historical trades as well as feedback and comments provided by secondary users. (This function will also give confidence to users by viewing recent successful or unsuccessful trades 1050); provide an 'Invite Trade' link that prompts a command and gives the option to users to invite other Users to a specific trade 1060; provide a 'Suggest' link that prompts a command and gives the option of suggesting a user to another user within any particular network 1070; provide a 'Trading Items' link that navigates the user to the master list of items and services available for trade 1080; provide a list of 'Trading Friends' that the primary user has accepted as trading friends, where hovering over the photo of each 'Trading Friend' a pop-up box will appear that will display the number of items available for trade, wanted items and a rating score of that particular user 109; provide a 'Stuff I want' link that navigates the User to a page that shows their most wanted items in order by most wanted 1100; provide a snapshot of 4, 6 or more items that show a photo with a description of that item, service, or favor for trade. Where the items are regularly rotated based on recent activity of most recently traded items 1110; provide a chat forum with a live feed of publicly shared comments from users within the network and the forum can also notify users of current successful trades and the updating of 'Trading Items' and 'Stuff I Wanted' lists within the network 1120; provide a 'Recent Trades' link 1050 which will divert the user to a page showing a list of most recent trades with links to other users that participated in one or more particular trade. These itemized 'Recent Trades' will give the user a 'Rating' per trade with an optional comment section for the trading recipient to provide feedback on the trade.

FIG. 2 depicts a screenshot of the 'Trading Items' page. The trading items page is generated by processor 110 executing personal property trading application 170 and trading items module, and is displayed to the user through a remote device 115. Through this trading items page a user, using remote device 115, can view, interact and input information into the personal property trading system 100 through the various fields and functions accessible through the trading items page as further described herein. As shown in FIG. 2, one of the functionalities of the 'Trading Items' page is to view a categorized list of items and have the accessibility of clicking on any specific item or category to view more detailed information or to view more items within that specific category. By clicking on any particular item it will navigate the user to a page with that specific item, service or favor. The 'Trading Items' page will be accessible through a link on every page of the website. Items are categorized in the order chosen by the primary user or in alphabetical order by default. Some of the features of the 'Trading Items' page can include the accessibility and functions of the users trading 'Main Page'. The trading items page can also: Provide a summarized list of all items to show a short breakdown of 'Trading Items' 201; Provide a complete list of 'Trading Items' by category is displayed with photos along with a brief description of each item, service or favor 202. Further, if space on any particular row within that category is exceeded users will be able to click on the 'More' link to be diverted to an additional page to show more of the same items within that category 203. On clicking any of the specific items, services or favors listed within the page, the user will be directed to the particular 'Items' page depicted in FIG. 3.

Figure 3:
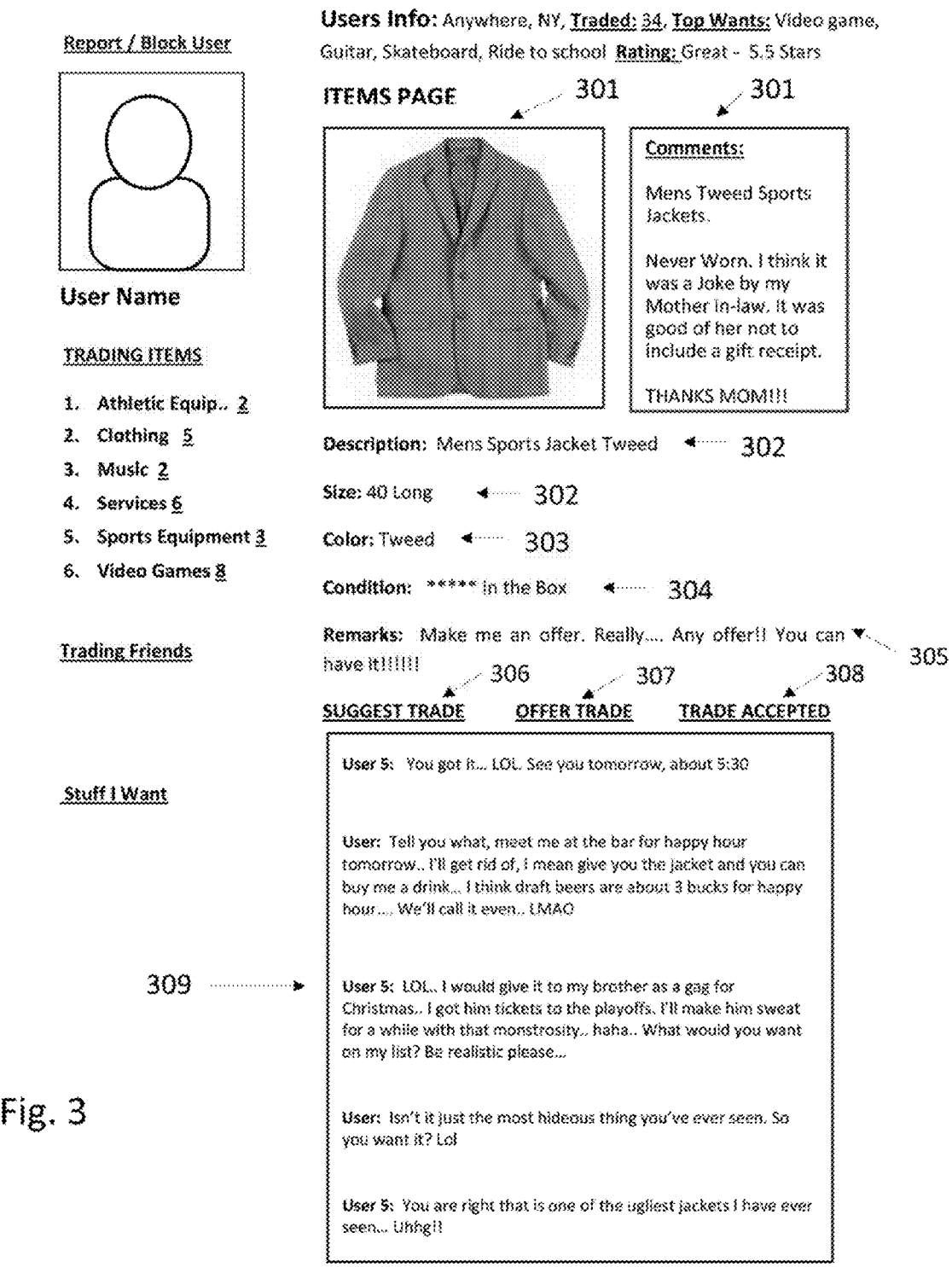
FIG. 3 depicts an exemplary screenshot of a Item Page webpage in accordance with at least one embodiment disclosed herein.

FIG. 3 depicts a screenshot of an exemplary 'Item' page. The item page is generated by processor 110 executing personal property trading application 170 and item module, and is displayed to the user through a remote device 115. Through the item page a user, using remote device 115, can view, interact and input information into the personal property trading system 100 through the various fields and functions accessible through the item page as further described herein. FIG. 3 shows a page that is displayed when navigated to by selecting and clicking on a specific item, service, or favor on either the 'Main Page' as shown in FIG. 1B or the 'Trading Items' page shown in FIG. 2. This item page, which is specific to a particular item, gives a description of the item, service or favor to decide if they wish to suggest 306, make an offer 307 or accept the trade 308. The item page will consist of and have most of the accessibility and functions of the Users 'Main Page' and the 'Trading Items' page. Item page can also: Provide a photo and a personalized comment of the item, service or favor for trade 301; provide a description of the item, service or favor 302; provide specific descriptive characteristics such as size or color 303; provide the condition of the personal property is stated if the trading item is a tangible item; provide a star rating in conjunction with a descriptive rating, such as below, will give users an understanding of the existing condition of the item. If the potential trade consists of either a service or favor then the item page can also provide a condition or contingency that will be offered as part of negotiations to the trade 304. For example the star rating can follow the following convention: *Rough Shape Not Great *Worth Trading **Almost New ***In the Box. Further, through the item page, the user can also provide a personal remark of the item, service or favor 305. Item page can also include a 'Suggest Trade' 305 link that navigates a user to their own list of 'Trading Friends' in order to introduce any particular trade to another user through the same or another network and will need to be accepted by the original trading user. Item page can also include an 'Offer Trade' link 307 that opens a private message page that will allow a user to make an offer with the hopes of coming to an agreement on that specific proposed trade.

The personal property trading system 100 can also include a comments section 309, also called a live private comment feed, that is displayed in the item page. Processor 110 executing personal property trading application 170 and comments module, is configured to display the comments section 309 to the user through a display of remote device 115. The comments section 309 allows users to view and create a dialogue for the purpose of being sociable with the intention of ultimately coming to an agreement for a specific trade. The comments section displays negotiations and social interactions between users of the system on the display of a user's computing device. The comments module also configures the system to receive a users response to comments using the interface of that user's computing device and cause the comments section to update based on the user's response thereby creating a stream of interactions between users that is visible to one or more users.

Figure 4:
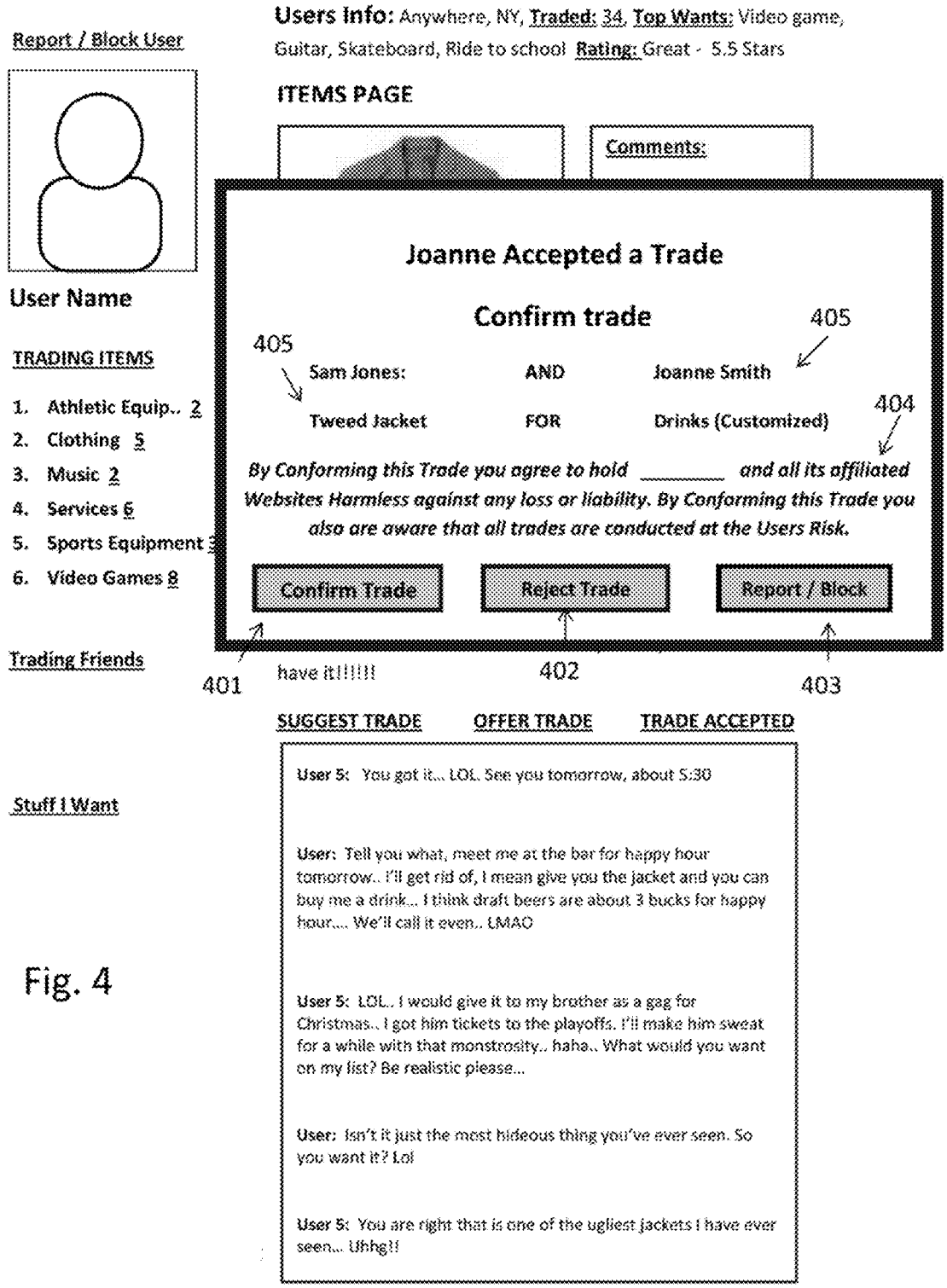
FIG. 4 depicts an exemplary screenshot of a Confirm Trade webpage in accordance with at least one embodiment disclosed herein.

Once the trade has been agreed the user can follow the 'Trade Accepted' link 308, provided on the item page, that which will open the 'Confirm Trade' pop-up screen shown in FIG. 4.

FIG. 4 shows a pop-up box that requests the trading user to either, confirm 401, reject 402, or report/block 403 the trade offered by another user or the user themselves. Processor 110 executing personal property trading application 170, is configured to display the pop up box requesting the confirmation of a trade on the display of user's computing device 115. By confirming the trade the user is in agreement to hold the website and all its affiliates harmless from any liability and any other conditions the inventor and website discloses 404. The 'Confirm Trade' pop-up box shows a worded description of the intended trade 405 to avoid confusion.

Processor 110 executing personal property trading application 170 can be configured to to generate a 'Stuff I Want' (also known as 'Wanted') page and display this page to a user on computing device 115. This page will give a detailed list of the desired items that a user is wanting in exchange for their own personal items, services or favors. This page will consist of and can include one or more of the accessibility and functions of the users 'Main Page' shown in FIG. 1 and 'Trading Items' Page shown in FIG. 2. The 'Stuff I Want' (also known as 'Wanted') page can be accessible through every page of the website page.

The personal property trading system 100 can also include a blocking module. The processor 110 is configured by executing personal property trading application 170 and blocking module, to regulate a user's compliance with the terms and conditions of the system. In accordance with the agreed Terms and Conditions of the user registration, users have an obligation to report other users attempting to "Direct Sell" or solicit merchandise or services. This also applies to any illegal activity and/or harassment. The report/blocking option gives users the comfort and security that they can, at any time, report and block other users from their list of acceptable 'Trading Friends'. Blocking a user would remove that user from their list of acceptable 'Trading Friends'.

The personal property trading system 100 can also include a Rating module. Processor 110 executing personal property trading application 170 and rating module can be configured to implement a 'Rating' system to assist with the control of non-compliant traders that attempt to use the website for profitable gain or direct "Cold" sales. A users 'Rating' system will be another way for users to have confidence with who they trade with. The 'Rating' system could be through any particular numbering system with perhaps a star or any other symbol for aesthetic purposes.

The personal property trading system 100 can also include a review recent trades module. Processor 110 executing personal property trading application 170 and review recent trades module configures the system 100 to display the most recent trades, either by date or category on computing device 115. This will assist a user's 'Trading Friends' to determine the user's specific interests and personal preferences.

The personal property trading system 100 can also include invite trade module. Processor 110 is configured by executing personal property trading application 170 and invite trade module to give the user the ability to invite other users to a specific trade, service or favor. This could be done through one invitation or several invitations to multiple 'Trading Friends'. Invitations may be rejected or blocked.

The personal property trading system 100 can also include a suggest users module. Processor 110 is configured by executing personal property trading application 170 and suggest users module to provide users the ability to suggest a 'Trading Friend' to another user with similar items and requests. 'Trading Friends' may also suggest other users to the primary user.

The Trading Items page can include a categorized list of items, services, or favors within the users 'Trading Items' page such as clothing, books, video games, tutoring, etc., can be custom created or inputted by using the websites standard categories template.

Furthermore, on the primary users 'Main Page' a list of 'Trading Friends' can be shown with a photo and user name, and on hovering over each individual photo, a brief description of that users 'Trading Items' and 'Stuff I Want' (also known as 'Wanted') items by category are shown. Another option would be to show who they are trading with.

The Stuff I Want page can display a list of items, services or favors that are desired and listed in order of most wanted are available for view by users. When updated by the primary user, a notification to 'Trading Friends' are sent out making them aware of what items, services, or favors are wanted.

The personal property trading system 100 can also include a Trading Notification. This notification sends other users within the primary users network a notification on any recent change, update or addition of their 'Trading Items, 'Stuff I Want' or 'Trading Friends' page as well as any 'Recent Trades'.

The personal property trading system 100 can also include a Trading Snapshot where the users 'Main Page' will show photos and brief descriptions of items, services or favors listed in a group of either four, six or more. These are randomly rotated to show what the primary user is looking to trade or what is wanted on their list of 'Trading Items' or 'Stuff I want' pages. A specific feature would be to show these items when hovering over a specific photo of users within their list of 'Trading Friends'.

The personal property trading system 100 can include a Trading Comment Feed. This feed is a common chat forum for users to have a general discussion in order to pursue trades or attempt to persuade others into a trade or chat. The intention is to create an environment for friendly dialogue and create excitement for the 'What will happen next' factor.

The personal property trading system 100 can also include video and/or chat functionality to allow users to communicate with other users through live video or voice. Users can also present and display recorded video streams to demonstrate and display items or services that are offered through the system.

The personal property trading system 100 can also include terms, conditions, disclosures and waiver terms that are displayed on a terms, conditions, disclosures and waiver page. These terms and conditions can include: Allowing the website to access the users list of 'Trading Friends' and other information they share on the Social Networking site; Holding the Website, its owners, and all affiliated companies harmless and against any liability for sharing personal information with other users; Accepting the obligation to report users not following the rules and regulations of the website being, but not limited to, direct sales or solicitation, illegal activity, slanderous content, and misleading users with false claims; To provide truthful descriptions of items, services or favors with no intent of misleading other users; Holding the website, its owners, and all affiliated companies harmless and against any liability for providing other users with a personal shipping or mailing address.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A personal property trading system, comprising:
a non-transitory computer readable storage medium,
one or more processors configured to interact with the computer-readable storage medium;
one or more software modules comprising instructions in the form of code stored on the storage medium and executing in the processor, the one or more software modules including:
a main page module executing in the processor and configuring the processor to generate a user page that displays a first user's personal property that is available for trading, wherein the processor is configured to provide the user page over a network for display on a display of one or more remote computing devices;
a comments module executing in the processor and configuring the processor to:
receive, with the processor using a communication interface over the network, from the first user and a plurality of other users of the system using respective computing devices, comments including:
messages concerning interactive negotiations and direct social interactions between the first user and each of the plurality of other users, responsive messages from one or more of the first user and the plurality of other users in response to the messages, generate, with the processor on the user page, a comments section including a live comment feed in association with the user's personal property displayed on the user page, display, with the processor on the user page in the live comment feed, the received comments including messages concerning interactive negotiations and social interactions between the first user and each of the plurality of other users of the system and the responsive messages, updating the live comment feed in real-time in response to comments received from the first user and the plurality of other uses through the interface;

a rating module executing in the processor and configuring the processor to:

receive from users using respective computing devices, reports concerning interactions with other users including non-compliant use of the system, wherein non-compliant use includes offering one or more of: direct sale of property and direct purchase of property;

implement, based on the reports, a rating system that scores users based on the reports and assists with the control of non-compliant users;

a blocking module executing in the processor and configuring the processor to, based on the rating, prevent non-compliant use of the system.

\* \* \* \* \*